(12) United States Patent
Byham

(10) Patent No.: US 9,205,782 B2
(45) Date of Patent: Dec. 8, 2015

(54) BAG FOR TRANSPORTING GAS CYLINDER

(71) Applicant: John Byham, Meadville, PA (US)

(72) Inventor: John Byham, Meadville, PA (US)

( * ) Notice: Subject to any disclaimer, the term of this patent is extended or adjusted under 35 U.S.C. 154(b) by 6 days.

(21) Appl. No.: 14/051,772

(22) Filed: Oct. 11, 2013

(65) Prior Publication Data

US 2014/0263502 A1 Sep. 18, 2014

Related U.S. Application Data

(63) Continuation-in-part of application No. 29/449,708, filed on Mar. 15, 2013.

(51) Int. Cl.
*B60R 7/04* (2006.01)

(52) U.S. Cl.
CPC ...................... *B60R 7/043* (2013.01)

(58) Field of Classification Search
CPC ....................... B60R 7/04; B60R 7/042; B60R 2011/0012–2011/0017
USPC ......................................................... 224/275
See application file for complete search history.

(56) References Cited

U.S. PATENT DOCUMENTS

| | | | | |
|---|---|---|---|---|
| 2,753,829 A * | 7/1956 | Agra | ............................ | 114/219 |
| 3,998,304 A * | 12/1976 | Edgerton et al. | ............. | 190/107 |
| 4,143,796 A * | 3/1979 | Williamson et al. | ....... | 222/181.3 |
| 4,246,945 A * | 1/1981 | Sterling | ........................... | 383/43 |
| 4,267,868 A * | 5/1981 | Lowe | ................................. | 383/2 |
| 4,790,463 A * | 12/1988 | Hansen | .......................... | 224/680 |
| 4,843,994 A * | 7/1989 | Wilson et al. | ................. | 114/219 |
| 5,012,964 A * | 5/1991 | Falletta et al. | ................ | 224/153 |
| 5,125,547 A * | 6/1992 | Russell | ......................... | 224/637 |
| 5,505,307 A * | 4/1996 | Shink | ........................... | 206/541 |
| 5,676,293 A * | 10/1997 | Farris | ............................ | 224/576 |
| D391,074 S * | 2/1998 | Bean et al. | ...................... | D3/201 |
| 5,743,447 A * | 4/1998 | McDermott | .................. | 224/153 |
| 5,894,780 A * | 4/1999 | Taniguchi | ........................ | 71/9 |
| 5,924,303 A * | 7/1999 | Hodosh | ........................ | 62/457.4 |
| D418,972 S * | 1/2000 | Gold | .............................. | D3/217 |
| 6,067,816 A * | 5/2000 | Hodosh | ........................ | 62/457.4 |
| 6,089,752 A * | 7/2000 | Moore | ................................ | 383/2 |
| 6,123,239 A * | 9/2000 | Lovitt | ........................... | 224/413 |
| 6,409,066 B1 * | 6/2002 | Schneider et al. | ............. | 224/585 |
| 7,083,331 B2 * | 8/2006 | Nykoluk | ........................... | 383/2 |
| 7,153,025 B1 * | 12/2006 | Jackson et al. | ..................... | 383/2 |
| 7,665,421 B2 * | 2/2010 | Martz | ........................... | 119/497 |
| 8,079,502 B2 * | 12/2011 | Montgomery | ................ | 224/627 |
| 2003/0201294 A1 * | 10/2003 | Gam | ............................ | 224/617 |
| 2005/0045673 A1 * | 3/2005 | Godshaw et al. | ............. | 224/153 |
| 2007/0164064 A1 * | 7/2007 | Nathan | .......................... | 224/153 |
| 2010/0108730 A1 * | 5/2010 | Sabbah | .......................... | 224/651 |
| 2011/0186611 A1 * | 8/2011 | Eberle | ........................... | 224/583 |

* cited by examiner

*Primary Examiner* — Brian D Nash

(74) *Attorney, Agent, or Firm* — Shumaker, Loop & Kendrick, LLP

(57) ABSTRACT

A bag for transporting a gas cylinder including a cylinder shaped body defining an interior compartment, a flap movable to expose and conceal an opening to the interior compartment, at least one handle for carrying the bag, and at least one strap configured to receive a vehicle seatbelt therethrough to secure the bag within a vehicle.

19 Claims, 5 Drawing Sheets

BAG FOR TRANSPORTING GAS CYLINDER

TECHNICAL FIELD AND BACKGROUND OF THE INVENTION

The present invention relates generally to a bag for transporting a gas cylinder such as a propane tank, and more particularly, to a bag generally commensurate in size and shape with a gas cylinder to be transported, the bag including handles for facilitating carrying and straps for securing the bag within a vehicle using a vehicle seatbelt, among other features.

Propane is a popular fuel for outdoor appliances such as gas grills, stoves, heaters, fire pits, etc. Propane, which is compressible to a transportable liquid, is typically stored in a steel cylinder fitted with a nozzle. The nozzle is protected from impact by way of a cylindrical steel collar that substantially surrounds the nozzle. The most common size of residential-use propane tank carries about 20 lbs of liquid fuel, and therefore the collar is typically shaped to define carrying handles to facilitate carrying the tank.

Most propane tanks are used to fuel outdoor appliances. Prolonged exposure to the outdoor environment causes the tanks to become dirty over time. Further, tanks that are used to fuel barbecues and gas grills are typically positioned in the vicinity of the cooking area, and thus are exposed to splattering and grease drippings. Empty tanks are usually exchanged with full tanks, which requires the consumer to disconnect the empty tank, load the empty tank into a vehicle, transport the empty tank to a retailer that offers tank exchanges, exchange the empty tank for a full tank, load the full tank into the vehicle, transport the full tank home, and finally connect the full tank to the appliance.

Because most residential consumers drive standard passenger automobiles ill equipped to accommodate dirty and bulky items, tanks are usually loaded into the back seat of the vehicle. Dirty tanks must be covered or the consumer risks soiling and damaging the interior of the vehicle. Cylindrical tanks must also be secured in place during transport to prevent shifting which may cause damage to the interior of the vehicle. Accordingly, what is needed is a bag for transporting a gas cylinder that protects the interior of a vehicle, secures the tank in place during transport, and also facilitates carrying the tank, among other advantages.

BRIEF SUMMARY OF THE INVENTION

In one aspect, provided herein is a bag for transporting a gas cylinder such as a propane tank.

In another aspect, the bag facilitates carrying a heavy gas cylinder.

In a further aspect, the bag is configured to substantially contain a gas cylinder, thereby preventing a dirty gas cylinder from coming into contact with other surfaces.

In a further aspect, the bag is generally commensurate in size and shape with the gas cylinder to be transported.

In a further aspect, the bag defines an interior volume capable of accommodating a 20 lb standard exchange propane tank.

In a further aspect, the bag is generally cylinder shaped.

In a further aspect, the bag includes a flap movable to expose and cover an opening to the interior of the bag.

In a further aspect, the bag is constructed from lightweight and durable material such as nylon.

In a further aspect, the bag includes means for utilizing an existing vehicle seatbelt to secure the bag within a vehicle.

To achieve the foregoing and other aspects and advantages, in one embodiment a bag for transporting a gas cylinder is provided herein and includes a cylinder shaped body defining an interior compartment for receiving the gas cylinder therein, a flap configured to move to expose and cover an opening to the interior compartment, at least one handle for carrying the bag, and at least one strap configured to receive a vehicle seatbelt therethrough to secure the bag within a vehicle.

In a further embodiment, the cylinder shaped body may be formed from a cylindrical sidewall and a circular bottom coupled to the cylindrical sidewall.

In a further embodiment, the flap may be coupled along a top edge of the cylindrical sidewall.

In a further embodiment, the flap may include at least one opening therethrough for grabbing the gas cylinder through the flap.

In a further embodiment, the flap may be retained in a closed position using a fastener.

In a further embodiment, the fastener may include one or more of a buckle, a hook-and-loop fastener, a snap, a button and a zipper.

In a further embodiment, the bag may include two handles positioned on opposing sides of the bag, the handles having a length sufficient to be simultaneously grabbed with one hand.

In a further embodiment, the at least strap may be positioned in the middle of the front of the bag.

In a further embodiment, the at least one strap may be an elongate member arranged vertically along the front of the bag, and the elongate member may be sewn to the bag at opposing ends of the elongate member and free from attachment to the bag along the middle of the elongate member.

In a further embodiment, the bag may include a pair of parallel, elongate straps positioned about the middle of the front of the bag.

In a further embodiment, attachments points between the cylinder shaped body and one or more of the at least one handle and the at least one strap may be reinforced with stitching sufficient to prevent ripping.

In a further embodiment, the cylinder shaped body and the flap may be constructed from waterproof fabric.

In another embodiment, provided herein is a bag for transporting a gas cylinder including a body defining an interior compartment commensurate in size with a gas cylinder to be transported therein, a flap attached along a top edge of the body movable to expose and cover an opening to the interior compartment, handles attached to the body for carrying the bag, and a pair of straps attached to a front of the body for receiving a vehicle seatbelt therethrough for securing the bag within a vehicle seat.

Embodiments of the bag can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
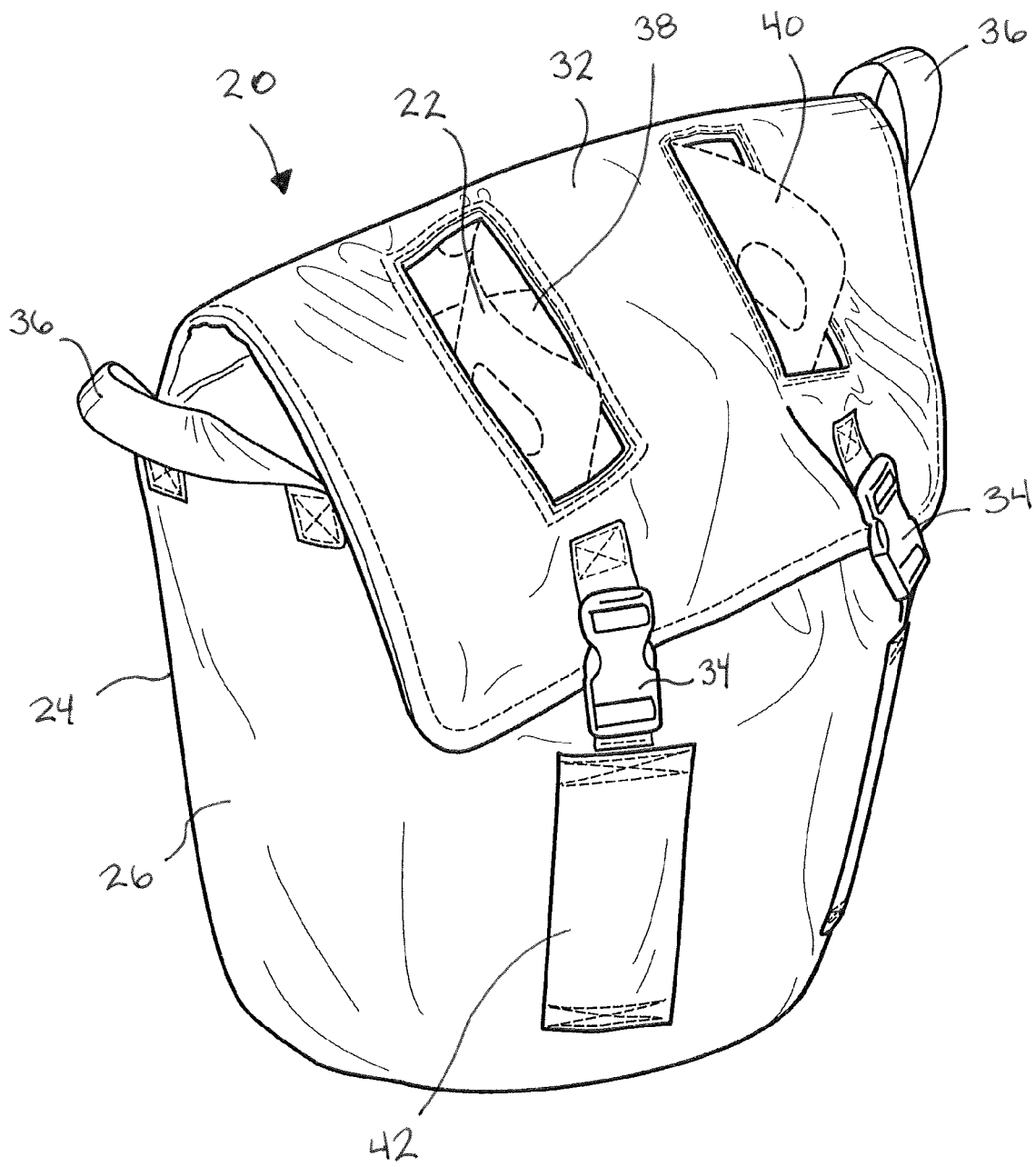
FIG. 1 is a perspective view of a bag for transporting a gas cylinder according to a preferred embodiment of the invention.
Figure 2:
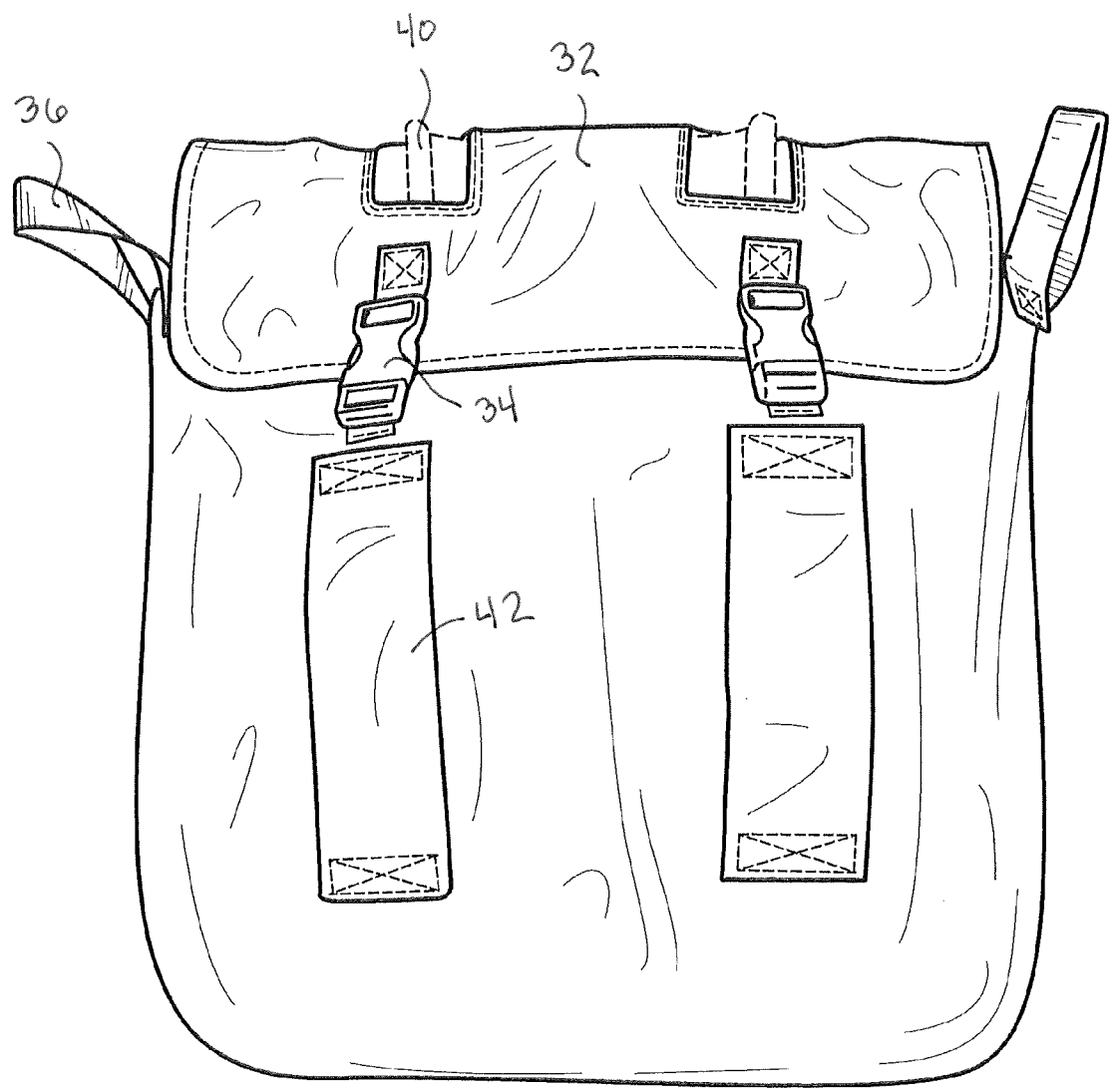
FIG. 2 is a front elevation view of the bag illustrating straps for receiving a vehicle seatbelt therethrough.
Figure 3:
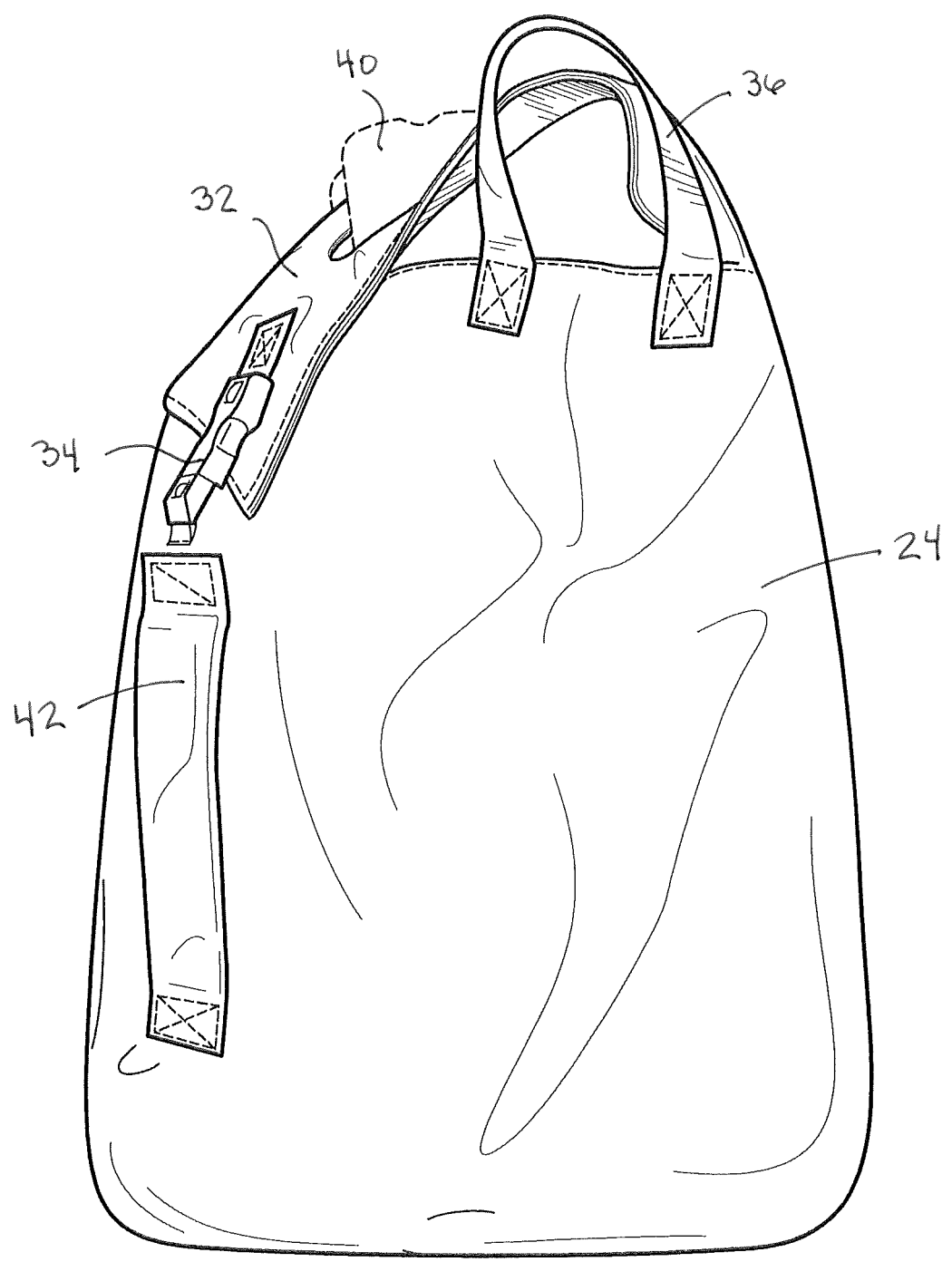
FIG. 3 is a side elevation view of the bag.
Figure 4:
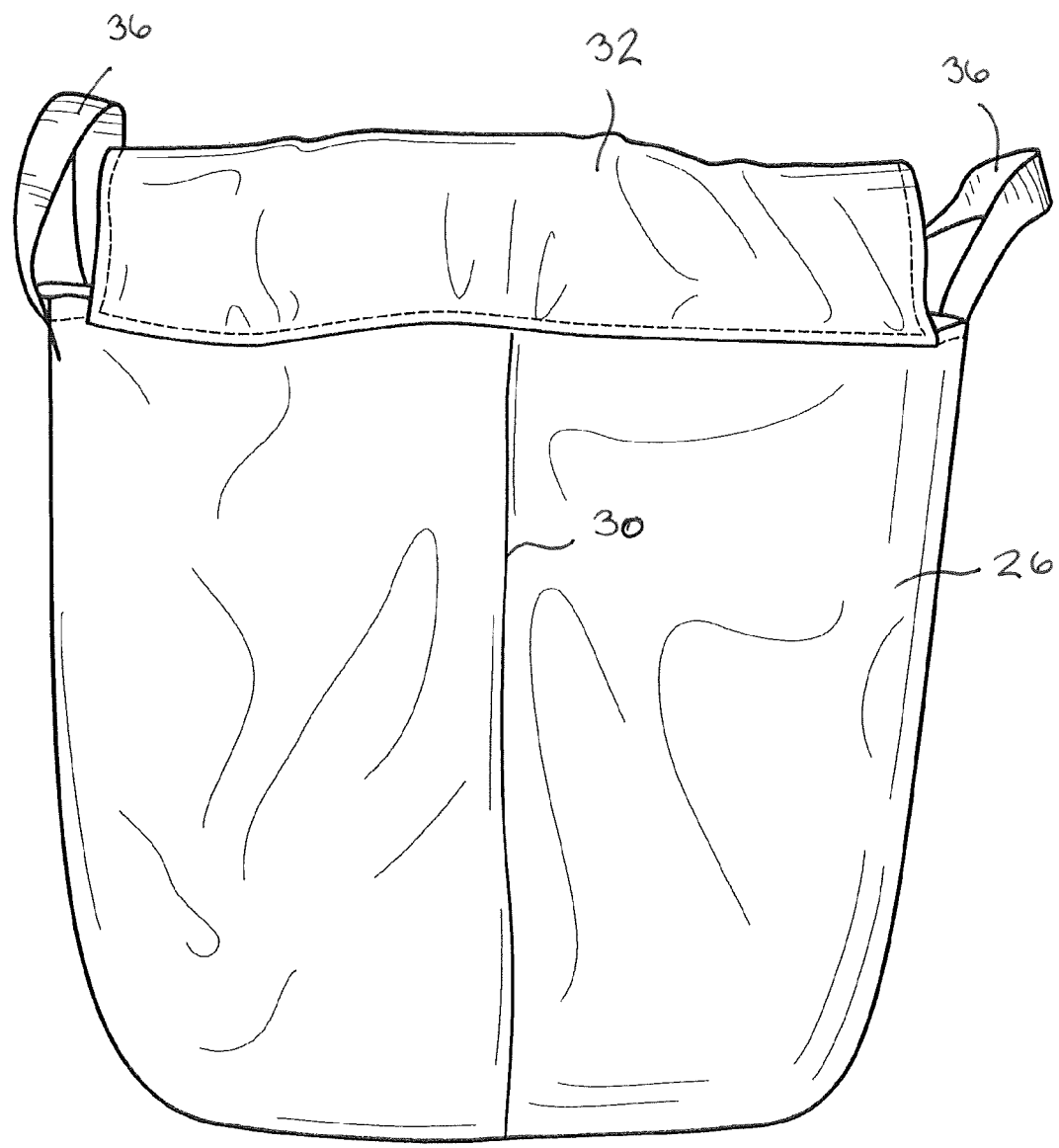
FIG. 4 is a rear elevation view of the bag illustrating carry handles.
Figure 5:
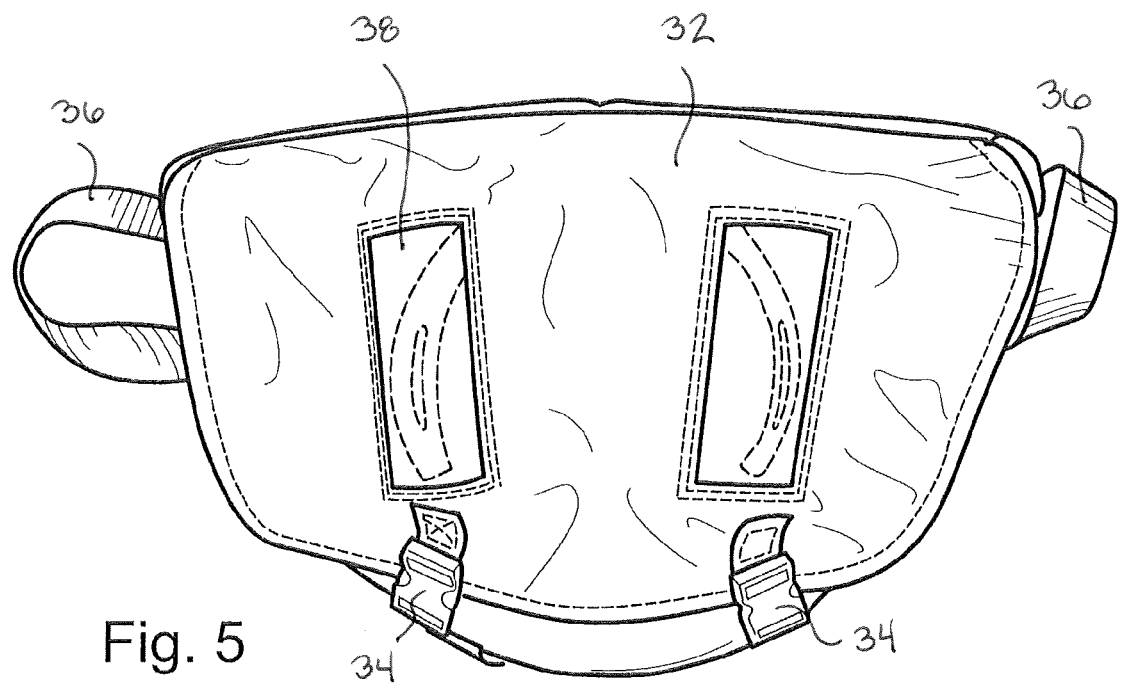
FIG. 5 is a top plan view of the bag illustrating openings through the top flap for grabbing the tank collar through the top flap.
Figure 6:
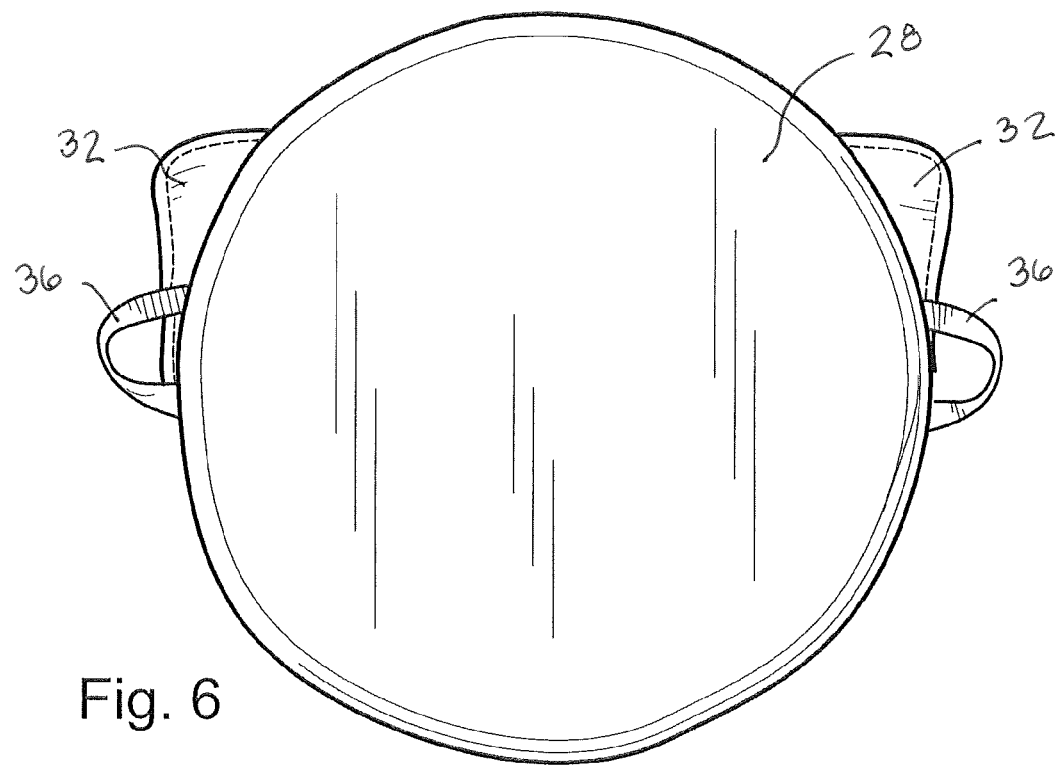
FIG. 6 is a bottom view of the bag illustrating the cylinder shape of the bag.

Referring to FIGS. 1-6, a preferred embodiment of a bag for transporting a gas cylinder is shown generally at reference numeral 20. In an exemplary embodiment, the gas cylinder may be a 20 lb standard exchange propane tank 22. The bag 20 defines an interior compartment configured to receive the propane tank 22 therein. The bag is generally sized and shaped commensurate with the size and shape of the propane tank 22. The interior compartment of the bag has a volume sufficient to contain the entirety of the propane tank 22. It should be understood that the size and shape of the bag may change based on the size and shape of the specific tank to be transported. For example, bags may be larger, smaller or shaped differently than the bag shown in the drawings.

The body 24 of the bag includes a generally cylindrical sidewall 26 and circular bottom 28 coupled to the sidewall thereby defining the interior compartment. The sidewall 26 may be constructed from a single rectangular piece of material (e.g. fabric) stitched together at opposing ends. The sidewall seam 30 may be positioned along the back of the bag for aesthetic reasons. The bottom 28 may be stitched all along the bottom edge of the sidewall such that there is no opening between the bottom and sidewall through which fluids and/or debris could escape the bag 20. The bottom 28 may be reinforced for added strength.

The top of the bag 20 defines an opening for providing access to the interior compartment through which the propane tank 22 is inserted and removed. A flap 32 is attached along a top edge of the sidewall 26 and is movable to selectively expose and cover the opening to the interior compartment. In the embodiment shown, the flap 32 is stitched along the top edge of the sidewall 26. In an alternative embodiment, the flap 32 may be an extension of the sidewall 26. When the flap 32 is "open," the opening to the interior compartment is exposed and the tank 22 can be inserted into or removed from the bag 20. When the flap 32 is closed, the flap is arranged generally horizontal or may be slightly curved as shown, thereby covering the opening to the interior compartment. The flap may be sized and shaped to closely conform to the shape of the opening. As show, the flap 32 is generally rectangular and "oversized" relative to the opening such that a portion of the flap overhangs at least the front of the opening.

The flap 32 may be held closed using one or more fasteners 34. As shown, the fasteners 34 are buckle assemblies, wherein one part of each buckle assembly is attached to the flap 32, and the complementary, engaging other part of each buckle assembly is attached to the bag body 24. The buckle parts may be provided on straps of fixed or adjustable length. In other embodiments, the fasteners 34 may include one or more of hook-and-loop fasteners, buttons, snaps, zippers, etc. In the case of hook-and-loop fasteners, an elongate strip of hooks may be stitched to the underside of the flap, while the corresponding loop-carrying member may be stitched to the front of the bag 20, or vice-versa.

The bag 20 preferably includes two handles 36 attached to opposite sides of the bag for facilitating carrying the bag. As shown, the handles 36 are straps each having a relatively short length. In another embodiment, the handles 36 may have a longer length such that the handles can be grabbed simultaneously with one hand. The handles are preferably constructed from durable material to prevent ripping, and are stitched to the body with reinforced stitching to prevent the handles 36 from being ripped from the body 24.

The flap 32 may include one or more openings 38 or "windows" that allow the tank collar 40 to be seen and grabbed through the flap 32. When the bag 20 includes flap openings 38, the handles 36 may have a short length to direct the user to carry the tank by grabbing the tank collar 40 through the flap. When the flap 32 is devoid of openings 38, the handles 36 may have a longer length such that both handles can be grabbed simultaneously with one hand to facilitate carrying. Bag strength may be relaxed or increased depending upon the particular handle/flap opening arrangement.

The bag 20 further includes at least one strap 42 positioned on the front of the bag for receiving a vehicle seatbelt therethrough for securing the bag within a vehicle seat. As shown, the bag 20 includes a pair of spaced, parallel straps 42, at least one of which receives the vehicle seatbelt therethrough. Each strap 42 is an elongate member attached to the body 24 at opposing ends of the strap and free along the middle of the strap such that the vehicle seatbelt is captured between the strap and the body. In this arrangement, the seatbelt is "threaded" through the strap 42 in one direction, and can only be removed by pulling the seatbelt back through the strap in the opposite direction. Two straps may be utilized to prevent the loaded bag from twisting in the seat.

The bag 20 may be constructed from any material or combination of materials, but is preferably constructed from lightweight, durable materials including, but not limited to, nylon, polyester, canvas, etc. The fabric may be treated with a waterproof coating such as polyurethane, silicone elastomer, fluoropolymers, etc.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A bag for transporting a gas cylinder, comprising: a cylinder shaped body defining an interior compartment; a single flap movable to expose and cover an opening to the interior compartment, the single flap comprising at least one permanent opening therethrough that at all times remains open such that a top of the gas cylinder is visible and accessible through the at least one permanent opening when the single flap is positioned covering the opening to the interior compartment; at least one handle for carrying the bag; and at least one strap configured to receive a vehicle seatbelt therethrough to secure the bag within a vehicle.

2. The bag according to claim 1, wherein the cylinder shaped body is formed from a cylindrical sidewall and a circular bottom coupled to the cylindrical sidewall.

3. The bag according to claim 1, wherein the single flap is coupled along a top edge of the cylindrical sidewall.

4. The bag according to claim 1, wherein the single flap comprises two parallel and elongate permanent openings therethrough.

5. The bag according to claim 1, further comprising at least one fastener for holding the single flap closed.

6. The bag according to claim 5, wherein the fastener comprises one or more of a buckle, a hook-and-loop fastener, a snap, a button and a zipper.

7. The bag according to claim 1, further comprising two handles positioned on opposing sides of the bag, the handles having a length sufficient to be simultaneously grabbed with one hand.

8. The bag according to claim 1, wherein the at least one strap is positioned in the middle of the front of the bag.

9. The bag according to claim 1, wherein the at least one strap is an elongate member arranged vertically along the front of the bag, and wherein the elongate member is sewn to the bag at opposing ends of the elongate member and is free from attachment to the bag along the middle of the elongate member.

10. The bag according to claim 1, further comprising a pair of parallel, spaced elongate straps positioned about the middle of the front of the bag.

11. The bag according to claim 1, wherein attachments points between the cylinder shaped body and one or more of the at least one handle and the at least one strap are reinforced with stitching sufficient to prevent ripping.

12. The bag according to claim 1, wherein the cylinder shaped body and the single flap are constructed from waterproof fabric.

13. A bag for transporting a gas cylinder, comprising: a body defining an interior compartment; a single flap attached along a top edge of the body, the single flap movable to expose and cover an opening to the interior compartment, the single flap comprising at least one permanent opening therethrough that at all times remains open such that a top of the gas cylinder is visible and accessible through the at least one permanent opening when the single flap is positioned covering the opening to the interior compartment; handles attached to the body for carrying the bag; and straps attached to the front of the body for receiving a vehicle seatbelt through at least one of the straps for securing the bag within a vehicle seat.

14. The bag according to claim 13, wherein the body is cylinder shaped and comprises a circular bottom.

15. The bag according to claim 13, wherein the single flap includes two parallel and elongate permanent openings therethrough.

16. The bag according to claim 13, further comprising a fastener for holding the single flap closed.

17. The bag according to claim 16, wherein the fastener comprises one or more of a buckle, a hook-and-loop fastener, a snap, a button and a zipper.

18. The bag according to claim 13, wherein the handles have a length sufficient to grip the handles simultaneously with one hand.

19. The bag according to claim 13, wherein the body and the single flap are constructed from waterproof fabric.

* * * * *